Patented May 19, 1931

1,806,302

UNITED STATES PATENT OFFICE

ALEXANDER LEE MAGRILL, OF DALLAS, TEXAS

FOOD PRODUCT

No Drawing.     Application filed December 31, 1928.  Serial No. 329,664.

This invention relates to improvements in food products and more particularly to potato-chip delicacies which I sometimes call potato-cheese chips.

An object of the invention is to produce improvements in a food product made from tubers such as potatoes or other vegetables and fruits or the like and to combine therewith a meat or milk product or other like nutritious food ingredients. More particularly it is an object to produce a food product comprising potato chips and finely-divided cheese in the form of sprinkles or gratings wherein the latter adheres to the surface of the former to produce a food delicacy known as potato-cheese chips and which may be sold in a way similar to the ordinary potato chips which have long been on the market.

In the manufacture of the food product I peel and slice the tubers, say potatoes or other selected vegetable or fruit, into a vessel of water. The slices or chips are washed in fresh water and soaked in any suitable way and handled in a manner similar to that in the preparation of ordinary potato chips which are prepared for the market and which sometimes requires soaking in several waters before cooking. The potato chips in their raw state are frequently soaked for thirty minutes or longer in one or more waters and are then well drained to leave the chips comparatively dry for the cooking process to follow.

After peeling, slicing, soaking and otherwise conditioning the raw product, such as potato chips, for the frying process, the prepared raw chips are preferably placed in baskets for frying and cooking in deep fat as ordinarily done in the preparation of potato chips in the form and kind now being manufactured and sold. The chips are fried to a golden brown color to suit the taste, all of which is carried out in any approved manner preliminary to treating the chips with the cheese or other food product. The chips may also be salted to suit one's taste, and the frying or cooking may be carried out in baskets immersed in the cooking fat or the potato chips may be cooked in other suitable containers.

Having fried the tuber chips as above explained, the cooked chips are removed from the cooking vessel or basket and the grease or fat permitted to drain off of the surface of the chips. It follows of course that a certain amount of oil, fat or grease may be allowed to remain on the surface of the chips and they may still be warm when the cheese, meat, milk, nut or other food product is applied to the surface of the oil-cooked potato chips.

A grated or otherwise finely-divided cheese product is sprinkled on the warm and slightly oily potato chips whereupon the cheese warms slightly and the oily surface and cheese adheres, followed by a further cooling of the treated chips which joins the finely-divided cheese particles to the surface of the potato chip and this process is carried out to such an extent that the grated cheese is retained on the surface of the cooked potato chips.

The grated cheese becomes warmed upon contact with the warm potato chips and the cheese particles melt or fuse into the warm oil or grease of the chips and in that way the cheese and chips become united so that the cheese particles are retained on the surface of chips. Any other soluble food matter which attaches itself to the chips by heat or warm fusion may be used instead of cheese.

While grated cheese is found to be one preferred food product which I sprinkle on the potato chips, I have discovered that ground or grated nut products, such as peanuts or other suitable food matter may be similarly sprinkled on the surface of the potato chips and thereby produce a food delicacy which is palatable and superior to the plain potato chip as ordinarily prepared. Any grated nutritious food matter may be sprinkled on the cooked potato chips and an ordinary flour sifting device is convenient means for sifting and uniformly applying the grated product to the chips.

A preferred method of preparing the potato-cheese chips is to allow the fried chips to drain for a considerable time in order that all traces of the cooking fat or grease be well removed. Thereafter the grated cheese, grated nuts or other finely-divided food matter may be applied. This method is usually preferred since by allowing all the grease to drain off, there remains little or no grease to soak into and combine with the cheese, and there is no grease left to become rancid or old and hence the potato-cheese chips remain fresh for a long period. It is found that the cheese and also the potato chips remain nutritious and fresh for a long time. I have discovered that grated dry cheese applied in this manner to potato chips produces a healthful and nutritious food product and the cheese grating adheres to the surface of the cooked chips.

I have described two methods of manufacturing the potato chips, first by applying the cheese gratings to the warm oily chip surface which knits or unites the cheese to the surface of the chips, and second by thoroughly draining the fried chips and subsequently sprinkling or sifting on the grated food or cheese. However, it is to be understood that the method of making the potato-cheese chips may be altered to still further extent without departing from the principle of the invention so long as the fried food chips are combined with grated food matter as explained.

Any suitable cheese may be used, but, it is usually grated and dried. The prepared cheese is placed in a flour sifter or similar device and from the latter the cheese is distributed over the surface of the chips while they are rolled or stirred about. It is convenient to place the fried and dried chips in baskets and then agitate the cooked chips as the grated cheese is being sprinkled thereon to attain uniformity of application of the cheese to the surfaces of the chips.

What I claim is:

The process of preparing tuber-cheese chips which comprises first cooking the raw chip in hot fat, draining off the excess hot fat from the chip, and, while the chip is still hot, sprinkling grated cold cheese thereon, whereby, as a result of the heat contained within the hot chip free of hot fat, the grated cheese fuses and firmly adheres to the chip.

In testimony whereof I affix my signature.

ALEXANDER LEE MAGRILL.